(12) United States Patent
Goldsack et al.

(10) Patent No.: US 6,831,890 B1
(45) Date of Patent: Dec. 14, 2004

(54) MEASURING NETWORK PERFORMANCE PARAMETERS IN DATA COMMUNICATION NETWORKS

(75) Inventors: Patrick Goldsack, Bristol (GB); Jeremy Peter William Brown, Edinburgh (GB); Brian Warren Woodroffe, Edinburgh (GB); Simon Love, Edinburgh (GB); James W. Davis, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 774 days.

(21) Appl. No.: 09/704,051

(22) Filed: Oct. 31, 2000

(51) Int. Cl.[7] .............................................. H04L 12/26
(52) U.S. Cl. ....................... 370/229; 370/252; 370/351; 709/223; 709/224
(58) Field of Search ............................... 370/229, 230, 370/231, 235, 239, 238.1, 236.1, 241, 252, 241.1, 249, 253, 351, 286, 401, 412, 503, 519; 379/406.08, 406.12; 455/427, 456.1; 709/223, 224

(56) References Cited

U.S. PATENT DOCUMENTS

| | | | |
|---|---|---|---|
| 5,521,907 A | 5/1996 | Ennis, Jr. et al. ............. 370/17 |
| 5,577,116 A | * 11/1996 | Townsend et al. ..... 379/406.12 |
| 5,764,912 A | 6/1998 | Rosborough ........... 395/200.54 |
| 6,041,352 A | 3/2000 | Burdick et al. ............. 709/224 |
| 6,058,102 A | 5/2000 | Drysdale et al. ............ 370/252 |
| 6,078,576 A | * 6/2000 | Schilling et al. ............ 370/347 |
| 6,085,243 A | 7/2000 | Fletcher et al. ............. 709/224 |
| 6,414,960 B1 | * 7/2002 | Kuhn et al. ............ 370/395.64 |
| 6,512,746 B1 | * 1/2003 | Sand .......................... 370/252 |
| 6,545,979 B1 | * 4/2003 | Poulin ...................... 370/241.1 |
| 6,556,540 B1 | * 4/2003 | Mawhinney et al. ........ 370/229 |
| 6,671,374 B1 | * 12/2003 | Nemri et al. .......... 379/406.08 |

FOREIGN PATENT DOCUMENTS

| | | |
|---|---|---|
| EP | 0 458 623 A2 | 11/1991 |
| WO | 00/60899 | 10/2000 |

OTHER PUBLICATIONS

Graham, I., et al., "Comparative Measurement of QoS on the Trans–Pacific Internet," *SPIE Conference on Quality–of–Service Issues Related to the Internet, SPIE*, vol. 3529, Boston, MA pp 289–294 (Nov. 1998).

* cited by examiner

*Primary Examiner*—Phirin Sam

(57) ABSTRACT

Data cells traversing an Asynchronous Transfer Mode (ATM) network (10) are passively monitored by probes at two spaced points (12,14). A filtering characteristic is applied to select cells comparatively infrequently, and timestamps or sequence numbers (or both) for the cells selected at each point are forwarded to a correlator (28). The correlator identifies similarities in the temporal patterns of intervals between timestamps received from each probe, and uses these similarities to identify and correlate timestamps relating to occurrence of the same cell at the two monitored points. The correlated timestamps are used to determine parameters indicative of the performance of the network, such as one-way delay, variation in that delay, and rate of cell loss.

12 Claims, 4 Drawing Sheets

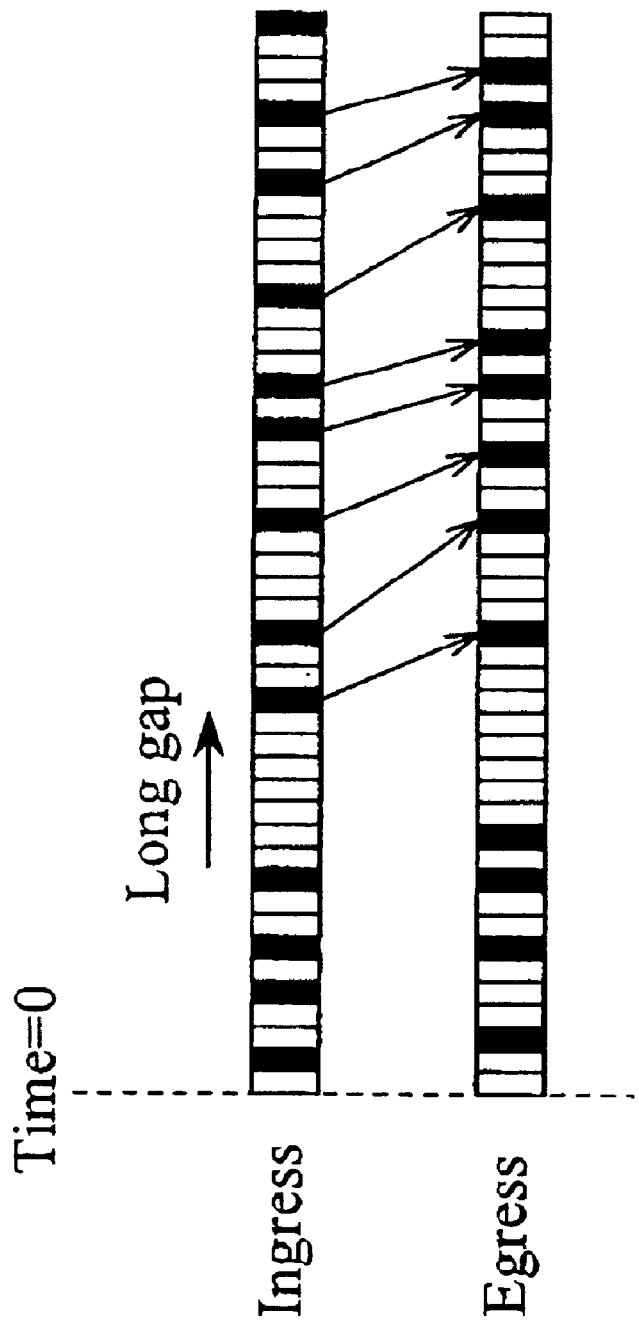

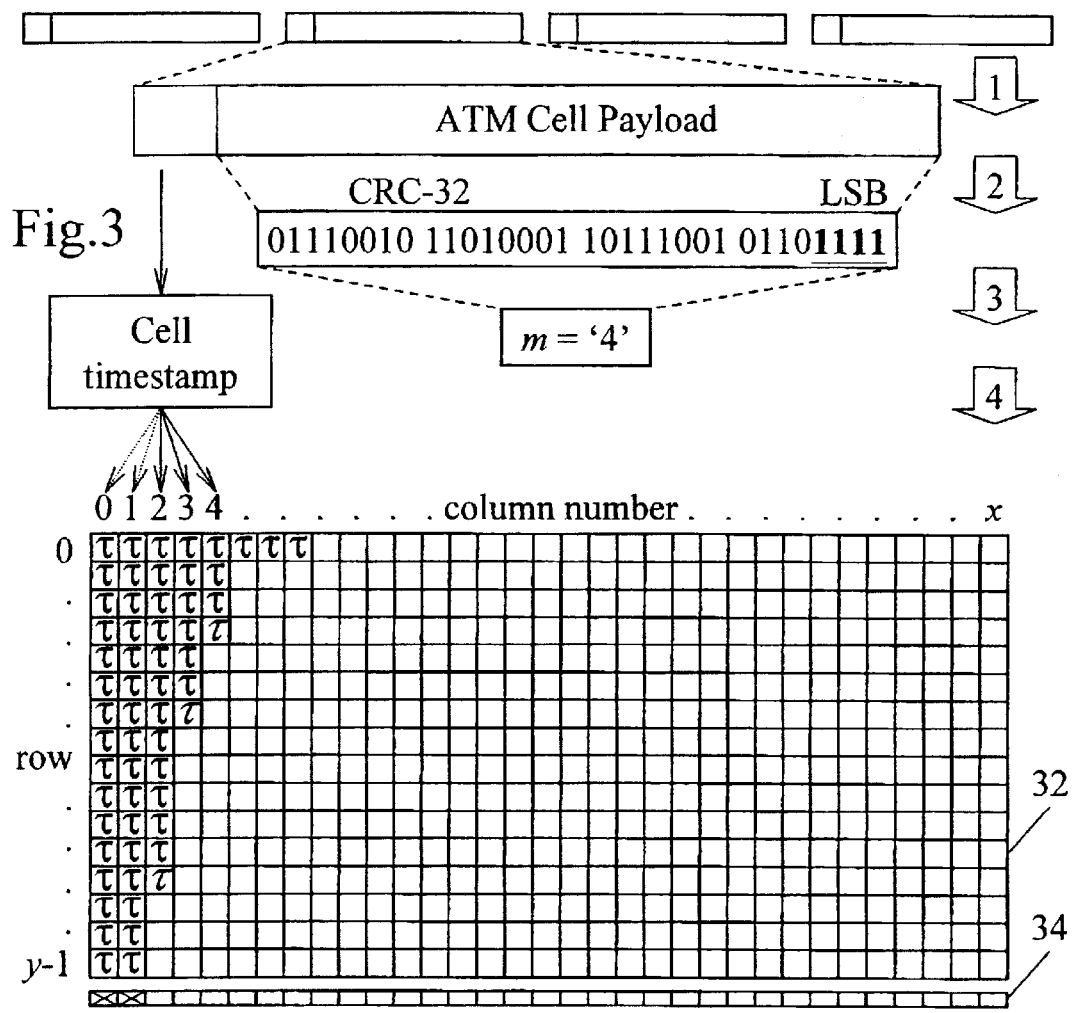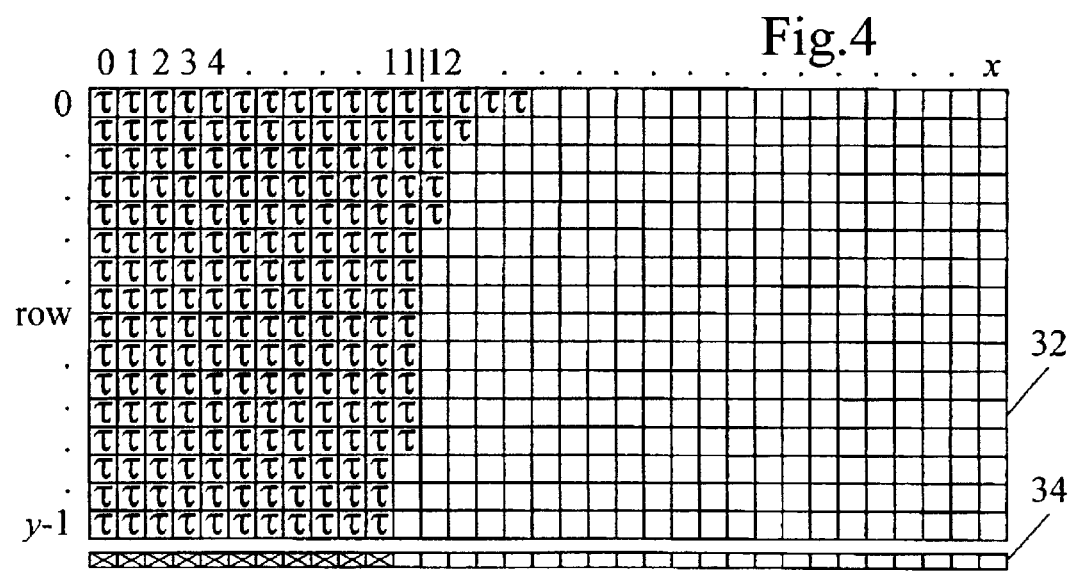

MEASURING NETWORK PERFORMANCE PARAMETERS IN DATA COMMUNICATION NETWORKS

TECHNICAL FIELD

This invention relates to methods and apparatus for measuring one or more network performance parameters in a data communication network, for example the one-way delay of data packets or cells (or similar data items) transferred through such a network or the proportion of data items lost in transit.

BACKGROUND ART

The continuing explosive growth in telecommunications traffic has led to the development of various techniques for providing users with telecommunications service and charging for it, and for monitoring and managing operation of telecommunications networks to optimise service to users and financial return to operators. For example, network operators will typically want to monitor various parameters relating a network's performance, in part to ensure the network's constituent components are functioning correctly. In addition, an operator may negotiate a charge structure with a user under which the charges payable by the user are related to the "quality of service" (as defined in terms of one or more network performance parameters) demanded by the user in advance or experienced during actual use. In this case both the operator and the user will wish to know what quality of service was actually attained, by reference to measurements of the relevant performance parameter(s).

To provide flexible and robust operation, data communication networks typically divide a data stream to be communicated across the network into a series of data patterns or items; these items are known by various names, depending on the network technology in use, such as packets in Ethernet networks, cells in Asynchronous Transfer Mode (ATM) networks, or frames in Frame Relay networks. For simplicity the term cell is used in the following description, with reference to ATM network technology, it being understood that this term in intended to embrace similar data patterns or items normally identified in other contexts by alternative terminologies (such as packets and frames).

Network performance parameters of interest typically include the proportion of data cells which are not successfully delivered to their intended destination (e.g. because of loss due to network congestion), the propagation delay between transmission of a cell into the network by a sending station and arrival of the cell at the receiving station, and variation of that delay with time.

It is an object of this invention to provide a method and apparatus which facilitate the measurement of network performance parameters.

DISCLOSURE OF INVENTION

According to one aspect of this invention there is provided a method of non-intrusively measuring a performance parameter of a data communication network which delivers data items in order of transmission, comprising the steps of:
 observing data items at a first location in the network;
 selecting data items whose contents match a first selection criterion;
 storing an indication of order of occurrence at said first location of each data item selected in accordance with said first selection criterion;
 observing data items at a second location in the network;
 selecting data items whose contents match a second selection criterion;
 storing an indication of order of occurrence at said second location of each data item selected in accordance with said second selection criterion;
 correlating sequences of data items occurring at said first and second locations in terms of patterns of occurrence at said first and second locations and of said first and second selection criteria; and
 determining a network performance parameter from said correlated sequences.

According to another aspect of this invention there is provided a method of selecting data items, comprising the steps of:
 generating a value corresponding to a data item;
 generating a compressed index from contents of the data item;
 storing said value in a sequence of consecutive storage locations selected from a plurality of such locations, each storage location being able to hold a predetermined maximum number of values, and said sequence of consecutive storage locations being determined starting at a predetermined location and in dependence upon said index and upon whether each storage location has already been selected for storage of more than said maximum number of values; and
 after a predetermined time interval supplying the values stored in at least the first storage location which, in sequence from said predetermined location, has been selected for storage of at most said maximum number of values.

BRIEF DESCRIPTION OF DRAWINGS

A method and apparatus in accordance with this invention, for non-intrusively measuring a performance parameter (such as cell transport delay) of an ATM data communications network, will now be described, by way of example, with reference to the accompanying drawings, in which:

FIG. 2 illustrates correlation of occurrence of data cells at two spaced locations in a network;

FIGS. 3 and 4 show a process for filtering data cells at each of two spaced points in a network.

BEST MODE FOR CARRYING OUT THE INVENTION, & INDUSTRIAL APPLICABILITY

Figure 1:
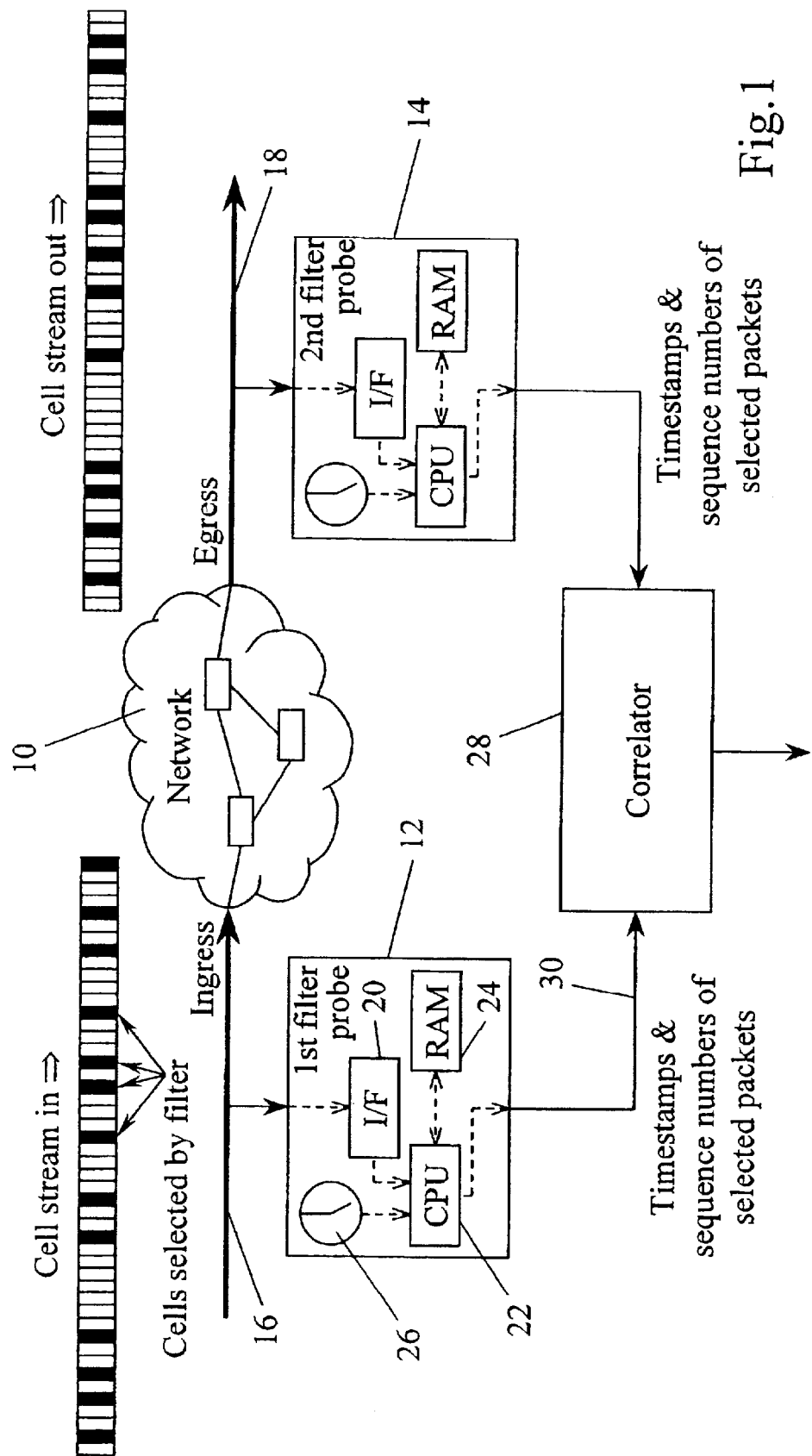
FIG. 1 shows an arrangement for passive monitoring of cells traversing an ATM data communications network.

Referring to FIG. 1, a network 10 is shown for carrying data using Asynchronous Transfer Mode technology; this technology itself is now well documented in the relevant technical literature and does not form part of this invention, and accordingly need not be described in detail here. The network has an ingress point and an egress point, and it is desired to measure various parameters relating to the transfer of ATM data cells between these two points. To this end two filter probes 12 and 14 are passively connected to links 16 and 18 in the network 10, adjacent the ingress and egress points respectively. The monitoring is passive in the sense that the operation of the links 16 and 18 is undisturbed by the presence of the probes 12 and 14, which simply make copies of at least part of the contents of some of the cells traversing the links.

Each probe comprises an interface 20, a processor 22 operating under the control of software program instructions in a memory 24 (which is also used for data storage), and a real-time clock 26. The interfaces 20 couple the probes 12 and 14 to the links 16 and 18 in such a way that the operating characteristics of the links are not altered. In the case of optical links, for example, the interfaces 20 may comprise optical power splitters; for electrical links they may be bridging isolators, or in the case of an Ethernet network LAN taps may be used.

The probes 12 and 14 monitor the data patterns comprised by the ATM data cells traversing the links, and select a sub-set of them. Data relating to time of occurrence of these selected cells (though not the cells themselves) are forwarded to a correlator 28, which may be co-located with one of the probes or remote from both of them via a communications link 30 which for example may be a LAN. The correlator 28 may comprise a suitably programmed general-purpose data processor, and uses the timing data to match occurrences of the same cell at each of the points monitored by the probes and then derive the required quality of service metric or metrics.

The first probe 12, which is monitoring cells at the ingress to the network 10, applies a filtering characteristic to the contents of each cell traversing the link 16, using a part of the cell contents that is invariant as the cell traverses the network, as described below. This filtering characteristic is arranged to be sufficiently discriminating that a majority of cells are not selected by the filter.

If a cell is selected a timestamp (the ingress timestamp) for the time of occurrence of that cell on the link 16 is generated by reference to the real-time clock 26 in the probe 12, and forwarded by the probe to the correlator 28. Nothing which independently identifies the cell itself or its contents is generated, stored or forwarded by the probe.

The second probe 14 operates in the same way to select cells traversing the link 18, using the same filtering characteristic as the probe 12, to forward timestamps (egress timestamps) for the occurrence of the selected cells to the correlator 28. The period during which the probe 14 selects cells is synchronised with that during the probe 12 performs selection, for example using the known Network Time Protocol.

Because the second probe 14 uses the same filtering characteristic as the first probe 12, both probes forward to the correlator 28 timestamps in respect of occurrence of the same cells at the ingress and egress of the network. As noted above, the discriminating nature of the filtering characteristic provides for timestamps to be generated only rarely relative to the occurrence of cells which have traversed the network. As a result the correlator 28 can correlate ingress and egress timestamps relating to occurrence of the same cell by examining the temporal patterns of the sequences of ingress and egress timestamps, and in particular the patterns of time intervals between successive timestamps generated by each probe. For example, a timestamp terminating a long gap in the ingress sequence is likely to correspond to the same cell as a timestamp terminating a long gap of similar length in the egress sequence and occurring slightly later, as shown in FIG. 2. Referring to FIG. 2, each block in the upper and lower lines represents a cell occurring at the network ingress and egress respectively. Shaded blocks indicate cells which are selected and for which timestamps are generated by the probes 12 and 14. The long gap between the fourth and fifth timestamped cells at the ingress point, and the similar and slightly later long gap between the fourth and fifth timestamped cells at the egress point can be taken as indicating that the fourth timestamped cells in each sequence correspond to one another and that the fifth timestamped cells in each sequence likewise correspond.

After ingress and egress timestamps corresponding to occurrence of the same cell at the two monitored points have been matched, the transport delay across the network 10 is determined by subtracting the value of the ingress timestamp from the value of the corresponding egress timestamp. In the case of "one-way" delay measurements the real-time clocks 26 in the probes 12 and 14 must be synchronised to a precision better than the minimum delay interval being measured.

Each probe 12 and 14 can also be arranged to send to the correlator 28 a cell sequence number for a timestamped cell, in addition to the timestamp itself. This cell sequence number is generated by the relevant probe, by incrementing a counter for every cell observed (prior to applying the filtering characteristic) at the point monitored by the probe. The correlator 28 can then determine the number of cells which have passed the ingress point between timestamped cells by subtracting the cell sequence number for the no cell for which a timestamp is supplied by the probe 12 from the cell sequence number for the $(n+1)^{th}$ cell for which a timestamp is likewise supplied. This cell count for the ingress point ($N_{ingress}$) can be compared with a cell count ($N_{egress}$) determined in the same manner for the cells observed at the egress point which have been previously identified, as described above, as corresponding to the $n^{th}$ and $(n+1)^{th}$ timestamped cells at the ingress point. The extent if any to which the egress cell count is less than the ingress cell count indicates how many cells have been lost in traversing the network between the ingress and egress points. Thus the cell loss can be determined as loss=$N_{ingress}$−$N_{egress}$.

The pattern of successive cell counts for the ingress and egress points can also be used by the correlator 28 to correlate occurrence of the same cell at the ingress and egress points, either to augment the use of timestamps for this purpose as described above, or as an alternative method of performing the correlation.

Further details will now be given, with reference to FIGS. 3 to 5, of implementation of the filtering characteristic used by the probes 12 and 14, and of the correlation performed by the correlator 28.

The filtering characteristic used is capable of dynamically adjusting its selectivity so that no more than a predetermined number of cells is selected during a predetermined filtering time interval, irrespective of variations in the number of cells traversing the monitored point. The timestamps for the selected cells are made available at the end of each filtering time interval.

The filter process requires two parameters to be specified:

y, the desired maximum number of timestamps to be supplied during the predetermined filtering time interval; and x, the number of steps in an adjustable filter selectivity, where each step increases the selectivity by a power of two; thus the average selectivity can be varied from "select all cells for timestamping" (=$2^0$), through "select on average half the cells for timestamping" (=$2^1$), "select on average one quarter of the cells" (=$2^2$), etc. to "select on average only one cell in $2^{(x-1)}$" and "select on average only one cell in $2^x$".

These parameters are used to define the size of a table 32 (FIG. 3) for temporarily storing timestamps τ during the filtering time interval, and the total number of column-overflow flags in a flag array 34. The table has y rows and x+1 columns (in the example shown in FIG. 3, 16 rows for 16 timestamps maximum, and 33 columns), and the flag array contains x+1 flags.

At the start of each filtering time interval the table 32 is cleared of any timestamps stored in the previous interval and the flags in the flag array 34 are reset. Each cell passing the probe monitoring point during the filtering time interval is processed as follows (the paragraph numbers correspond to the numbered arrows in FIG. 3):

1—Typically only certain cells in an ATM network will be of interest, such as those relating to a particular data connection. These cells can be identified by examining information in the cell header, such as the virtual circuit (VC) to which the cell relates. If a cell has a required value in the VC field a timestamp τ is generated by reference to the real-time clock in the probe, and the cell is forwarded for filtering.

2—A part of the cell which is invariant as the cell traverses the network (e.g. the cell's data payload) is used to generate a hashed value (i.e. a compressed value which is repeatably derivable from the invariant cell portion and which can be used as an index). The hashed value is x bits in length. One example of a convenient hashing technique is the cyclic redundancy check (CRC) algorithm used to generate check codes for data payloads. Thus the CRC-32 polynomial for generating the CRC code for an ATM AAL-5 payload data unit can be used to generate the required 32-bit hashed value.

3—Starting from a predetermined end of the hashed index value, e.g. the lowest significant bit, the total number of successive bits which have a value of 1 is counted, resulting in a value m between 0 and x (x=32 in this case). In the example hashed value shown in FIG. 3 (01110010 11010001 10111001 01101111), this count m is 4.

4—For every one of the $0^{th}$ to $m^{th}$ columns in the table 32 which has not overflowed (as indicated by the respective flag in the flag array 34), the timestamp τ determined at step 1 is stored in the next free row of the column. In the example shown in FIG. 3, the columns 0 and 1 have overflowed, as indicated by the respective column-overflow flag's being set (represented by a cross). The timestamp τ is stored in the free rows labelled 12, 6 and 3 of the columns 2, 3 and 4 respectively, as indicated by the italic symbol τ. If any of the $0^{th}$ to $m^{th}$ columns is found to be already full (i.e. it contains y timestamps) but the column-overflow flag is not yet set, then the flag value is toggled to indicate that overflow has now occurred.

At the end of the filtering time interval, the column of the table 32 which contains the most entries but for which the respective column-overflow flag is not set is selected, and the timestamps τ that column contains are supplied to the correlator 28. In the present application, where correlation between two autonomous probes is desired, the contents of the adjacent higher-numbered column are also forwarded. This facilitates the correlation process even if the probes have made slightly different choices about which column should receive a timestamp for a particular cell passing the two monitored points (e.g. as a result of cell loss within the ATM network, or because of slight asynchrony in the occurrence of the filtering time intervals in the two probes). In the example shown in FIG. 4, columns 0 to 10 have their column-overflow flags set and are ignored. The timestamps in columns 11 and 12 are forwarded to the correlator 28.

The values stored in the table 32 are timestamps in this instance, because timestamps are desired for the purpose of subsequent correlation of occurrence of cells at the monitoring points. The filter process described above can be used in other environments, in which case other kinds of values may be stored in the table 32, depending on the intended use of the filtered data.

As previously noted, the correlation process relies on the fact that cells are only rarely selected for forwarding of timestamps to the correlator 28. Thus the period between timestamps is much longer than the maximum delay to be measured (e.g. one to two orders of magnitude greater). For example, if the filtering time interval is five minutes, and the number of samples is limited to 16, a cell timestamp will be selected for forwarding on average only once every 18–19 seconds, assuming cells whose timestamps are selected are evenly distributed over the filtering time interval. This is sufficiently infrequent to enable network delays of the order of hundreds of milliseconds to be measured effectively.

Figure 5:
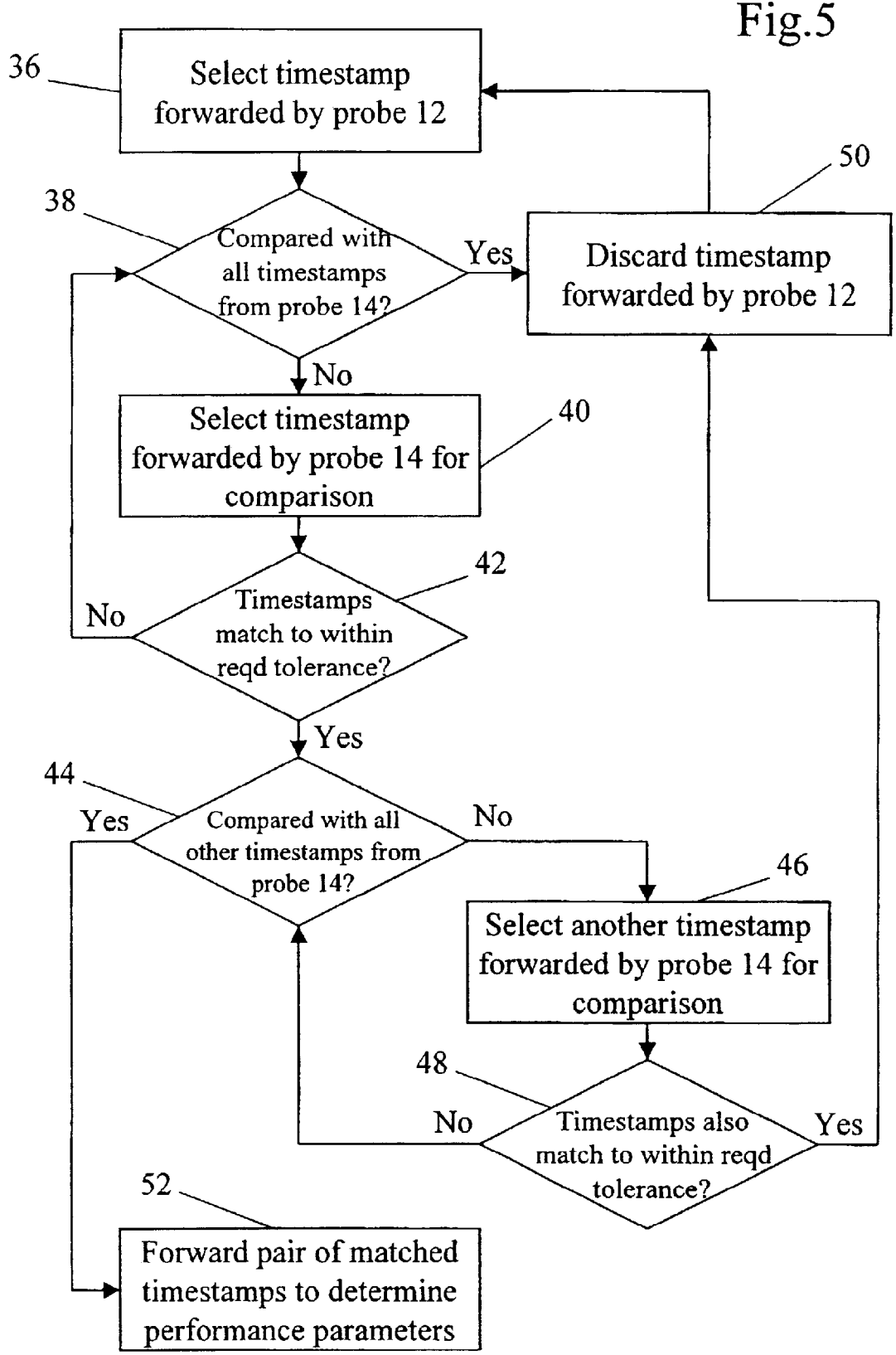
FIG. 5 is a flowchart of a process for matching timestamps for cells observed at these two spaced points.

Correlation of the timestamps from the two probes 12 and 14 is accomplished by matching the timestamp values, as follows (see FIG. 5):

(a) Select each timestamp in turn from the set forwarded by one of the probes (step 36 in FIG. 5).

(b) Search through the timestamps forwarded by the other probe, seeking a matching timestamp which matches the selected timestamp to within a predetermined tolerance which is no greater than the expected maximum delay across the network plus the maximum error in synchronisation of the probes' clocks (steps 38, 40, 42).

(c) If a matching timestamp is found, check that it is the only matching timestamp within the permitted tolerance (steps 44, 46, 48). If any more are found, the filtering characteristic has selected cells which occur close together, so a reliable match cannot be made and the timestamp selected at step 36 should be discarded (step 50).

(d) If no matching timestamp can be found, discard the timestamp selected at step 36 (step 50). this may occur because the cell corresponding to the selected timestamp was lost as it traversed the network between the probes, or because the filtering time intervals of the two probes were not precisely synchronised.

Once the timestamps from the two probes have been matched the required performance parameter(s) are determined (step 52). For example, the transport delay between the probes for the corresponding cells is determined by subtracting the earlier timestamp from the later one in each pair.

A similar technique can be used for correlating sequence numbers to match occurrences of the same cell at the two probes, as mentioned earlier.

What is claimed is:

1. A method of non-intrusively measuring a performance parameter of a data communication network which delivers data items in order of transmission, comprising:

observing data items at a first location in the network;

selecting data items whose contents match a first selection criterion;

storing an indication of order of occurrence at said first location of each date item selected in accordance with said first selection criterion;

observing data items at a second location in the network;

selecting data items whose contents match a second selection criterion;

storing an indication of order of occurrence at said second location of each data item selected in accordance with said second selection criterion;

correlating sequences of data items occurring at said first and second location in terms of patterns of occurrence at said first and second locations and of said first and second selection criteria; and determining a network performance parameter from said correlated sequences, wherein the first and second selection criteria are varied dynamically according to the characteristics of data items traversing the network.

2. The method of claim 1, wherein said indication of order of occurrence comprises a timestamp indicating time of observation of the item at a location.

3. The method of claim 1, wherein said indication of order of occurrence comprises a sequence number indicating ordinal position of the data item in a sequence of data items observed at a location.

4. The method of claim 1, wherein the network performance parameter measured is one-way delay of data items transferred through the network, variation of that delay, or proportion of data items lost during transfer.

5. The method of claim 1, wherein the network is an asynchronous transfer mode network.

6. The method of claim 1, wherein the first and second selection criteria are the same as one another.

7. The method of claim 1, wherein the data items are any one of packets, cells and frames.

8. A method of selecting data items comprising:

generating a value corresponding to a data item;

generating a compressed index from contents of the data item;

storing said value in a sequence of consecutive storage locations selected from a plurality of such locations, each storage location being able to hold a predetermined maximum number of values, and said sequence of consecutive storage locations being determined starting at a predetermined location and in dependence upon said index and upon whether each storage location has already been selected for storage of more than said maximum number of values; and after a predetermined time interval supplying the values stored in at least first storage location which, in sequence from said predetermined location, has been selected for storage of at most said maximum number of values.

9. The method of claim 8, wherein said value differs from the data item itself.

10. The method of claim 6, wherein said value is a timestamp indicating time of observation of the data item at a location, or a sequence number indicating ordinal position of the data item in a sequence of data items observed at a location.

11. The method of claim 8, wherein said index is derived by hashing the contents of the data item.

12. The method of claim 11, wherein said index is derived by counting the number of consecutive symbols or the hashed contents of the data item which have a predetermined value.

* * * * *